Aug. 27, 1963 A. E. ELLIS, JR 3,102,207

TRANSISTOR MEMORY CIRCUIT

Filed March 11, 1959

INVENTOR
A. E. ELLIS, JR.
BY
S.E. Hollander
ATTORNEY

United States Patent Office 3,102,207
Patented Aug. 27, 1963

3,102,207
TRANSISTOR MEMORY CIRCUIT

Albert E. Ellis, Jr., New York, N.Y., assignor to Bell Telephone Laboratories, Incorporated, New York, N.Y., a corporation of New York Filed Mar. 11, 1959, Ser. No. 798,745
14 Claims. (Cl. 307—88.5)

This invention relates to transistor memory circuits and more particularly to those employing junction transistors as the basic memory elements.

In telephone switching circuits for connecting subscriber stations to a central office, various degrees of concentration may be provided to reduce the total cost of the circuitry. That is, the number of paths actually provided to connect a given number of subscribers to the central station may be less by some factor than the total number of subscribers. In one switching system, for example, ten paths or links to the central office may be provided to handle the traffic of sixty subscribers. In such a system it is, therefore, necessary that a means be provided for determining with alacrity the links which are available for use at any instant.

In an electronic switching system this determination may be accomplished by scanning circuitry which interrogates the state of each link. In addition, in such an electronic system it is necessary to provide some means for signaling the central office that a certain function is to be performed in relation to the customer, that is, upon hang-up, to open the link to other subscribers or, upon a request for service or answer, to provide the customer with a link for completing the call. This last determining and signaling function may be accomplished by memory circuitry which remembers the prior state of each link and upon interrogation compares that prior state with the present state of the link and signals the central office in a manner indicative of the type of change required in the interrogated link.

To this end, it is an object of this invention to provide memory circuitry which may be utilized for remembering the prior states and signaling the changes in state of the individual links of telephone switching circuitry connecting subscribers to the central office.

In electronic switching systems for telephone circuitry a portion of the concentrating circuitry is necessarily positioned in areas remote from the central office. The provision of power to a myriad of remote concentrators presents a problem. Circuitry which dissipates a large amount of energy requires bulky and expensive power sources. It is desirable that all components of the remote circuitry require a minimum amount of power for operation and utilize as few independent power sources as possible.

It is, therefore, another object of this invention to provide memory circuitry for use in remote telephone concentrating circuitry which consumes a small amount of total power and is adapted to utilize power from a minimum number of independent sources.

Since the memory circuitry is to be positioned remote from the central office and is to serve large numbers of customers, it is desirable from a maintenance standpoint that the complexity of the circuitry be reduced to a minimum. The circuitry must fit, for instance, in a receptacle, such as a box, mounted on a telephone pole. An overall reduction in circuit complexity is further desirable both from a size and cost consideration.

It is, therefore, another object of this invention to provide memory circuitry including a minimum number of components.

One arrangement for attaining the last-mentioned object involves providing a minimum number of basic memory cells, each cell including a minimum number of elements, and utilizing common control circuitry to control all of the cells. Employment of common control circuitry, however, presents unique problems. For instance, inappropriate switching of non-selected memory cells may be caused by sudden changes in voltage or current occasioned by changes of state of the selected, and appropriately switching, cells.

It is, therefore, another object of this invention to provide for the utilization of basic memory cells controlled by common control circuitry having a minimum number of components and for the preclusion of inappropriate switching of non-selected memory cells.

Briefly, these objects are accomplished in accordance with aspects of this invention by a circuit which utilizes a plurality of basic memory cells associated in parallel. Each of the cells comprises a two-terminal PNPN junction transistor capable of two-state operation connected in series with a transistor access switch. Connected in common to all of the memory cells at a first terminal are "set," "reset," and "interrogate" controlling circuits for switching the cells to each operational state and for determining the state of each of the cells. Each of the controlling circuits includes a transistor switch connected in series with a resistor of a value dependent on the amount of current desired for the selected control operation.

Connected in common to all memory cells at a second terminal are an output amplifier, detecting means, and a hold current supply. The hold current supply is especially advantageous in this circuit and includes a transistor connected and biased to provide hold current to memory cells in the set or ON state. Additionally, the hold current supply is adapted to allow a detectable voltage excursion at the second common terminal while damping large voltage excursions thereat caused by switching of the selected cells, and thereby preventing inappropriate switching of nonselected memory cells.

It is a feature of this invention that a memory circuit comprises a plurality of shunt connected memory cells having common control circuitry.

It is another feature of this invention that a common source provided to supply current to maintain memory cells in the ON state of operation is adapted to substantially eliminate voltage excursions which tend to cause erroneous pulsing of memory cells.

Another feature of this invention resides in the use of basic memory cells connected to utilize a minimum number of components and to require a minimum of operating power.

These and other objects and features of this invention may be better understood upon consideration of the following detailed description and the accompanying drawing, in which.

Figure 1:
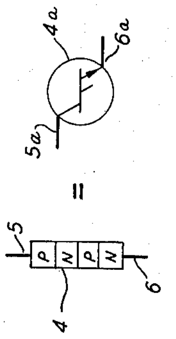
FIG. 1 is a diagram equating the symbolism heretofore used to illustrate a two-terminal PNPN junction transistor to the symbolism adopted herein.

Referring now to FIG. 1 there is shown in block diagram form a two-terminal PNPN junction transistor 4 having a first terminal 5 and a second terminal 6. This transistor 4 may illustratively be of a type disclosed in Patent 2,855,524 of W. Shockley. Equated thereto is an identical two-terminal PNPN junction transistor **4*a* shown, however, in schematic form. This transistor 4*a* has a first terminal 5*a* corresponding to the terminal 5 of the transistor 4, and a terminal 6*a* corresponding to the terminal 6**.

*General Description*

Figure 2:
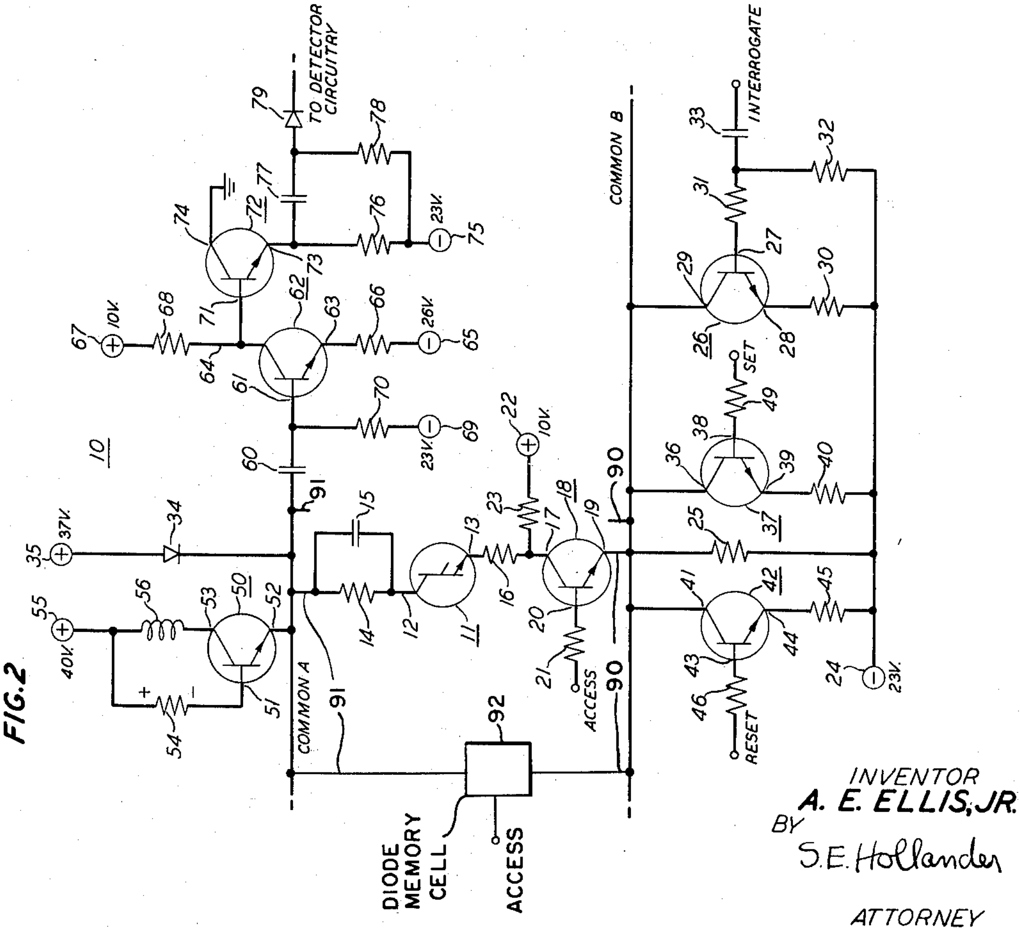
FIG. 2 is a schematic representation of a circuit illustrative of this invention.

Referring to FIG. 2 there is shown a memory circuit 10 including a plurality of memory cells, for instance ten (only one of which is shown in detail) connected in parallel. Each cell includes a PNPN junction transistor 11 connected to an NPN junction transistor 18. The transistor 11 is a two-state device which operates in a high impedance state for voltages applied thereacross below a certain value and in a low impedance state for voltages above that value. Once placed in the low impedance state by application of a voltage of greater than the aforementioned value, the transistor 11 remains in that state as long as sufficient current is provided. The transistor 18 connected with each transistor 11 acts as a switch to connect that transistor 11 to the various control circuitry.

Each memory cell is uniquely associated with a particular link or connection to a control office by a scanner. The latter equipments are not shown as not essential to an understanding of the present invention. It is understood, however, that a memory cell 11 is adapted to store the prior state of the associated link and when the prior state of the link as determined by scanning the cell and the present state of the link as determined by scanning the link differ, known arrangements may be utilized to signal the central office and to revise the state of the cell to conform with the present state of the link.

The control circuitry includes three transistors 26, 37 and 42 adapted to control the voltage across the selected transistor 11 and thereby to change the operating state thereof. The transistors 26, 37 and 42 exert their various control functions by inserting impedances into the circuit 10 to control the current therethrough.

Figure 3:
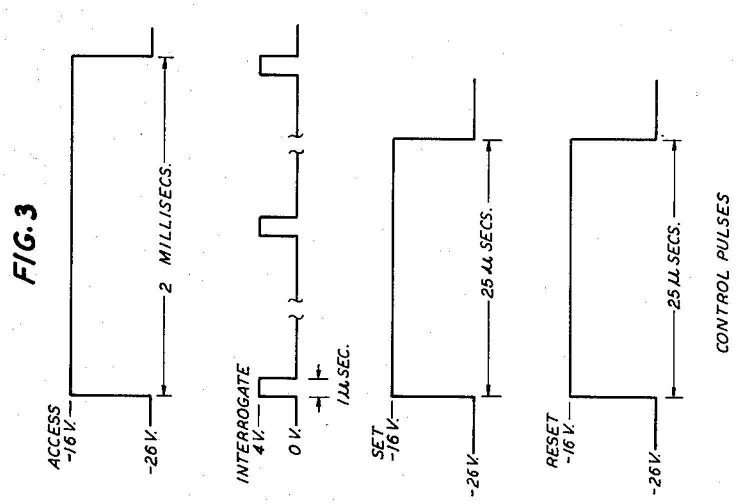
FIG. 3 shows diagrams of voltage versus time illustrative of the input pulses to each of the individual control portions of the circuit of FIG. 2.

The transistors 18, 26, 37 and 42 are all controlled in accomplishing their various functions by input pulses such as shown in FIG. 3 which are applied to the bases of those transistors 18, 26, 37 and 42.

Connected at the output of the memory cells is a common hold current supply source including a diode connected source of potential 35 adapted to maintain a common output point A at a potential greater than a first value and a transistor 50 biased to allow normal linear operation but maintain the common point A below a second higher value of potential. The hold-current supply thus allows a small voltage excursion between said first and second potentials at the point A to provide a detectable output but a voltage excursion less than adequate to falsely switch the memory cells.

To monitor the output, two transistors 62 and 72 are connected to provide amplification of the voltage excursions at the common point A.

Circuit 10 is adapted to operate in the following manner. As each link to the central office is scanned, the transistor 11 identified therewith is also scanned by operating the access transistor 18. As access is gained an interrogation pulse is applied to the selected transistor 11 by operating the interrogating transistor 26. If, then, the selected transistor 11 is in the low impedance state, a signal will be passed to the detector, while if the transistor 11 is in the high impedance state no signal is passed thereto. The presence or absence of a signal from the circuit 10 is compared in circuitry, not shown, to the signal indicative of the state of the selected link. If the state of the link and the transistor 11 differ, the central office may, by known arrangements, be signaled so that it may perform the necessary operation in reference to the customer's line. Further, if the signals differ at the comparison circuitry, not shown, a signal will be sent to either the set transistor 37 or the reset transistor 42 to cause that transistor 37 or 42 to operate and place the transistor 11 in the state indicative of the present state of the link corresponding thereto. The scanning circuitry then operates to permit access to the next succeeding transistor 11.

*The Memory Cells*

Referring to FIG. 2 there is shown a memory circuit 10 comprising a plurality of two-terminal PNPN junction transistors 11, each having a first terminal 12 and a second terminal 13. Each of the transistors 11 is uniquely associated with a link or path for connecting a subscriber to the central office. The transistors 11, only one of which is shown, are each connected to a first common electrical point A by a shunt combination including a resistor 14 and a capacitor 15 connected between the terminal 12 and the point A. Connected to point A by a diode 34 is a source of potential 35 utilized to bias all of the transistors 11. Other cells, such as cell 92 not shown in detail but identical to the one disclosed, may be connected to the common point A, by the lead 91, for instance.

Each transistor 11 is connected at its terminal 13 by a resistor 16 to a collector terminal 17 of an NPN transistor 18. Each transistor 18 has a base terminal 20 and an emitter terminal 19 which is directly connected to a second common point B. Other cells, such as cell 92, may be connected to the common point B, by the lead 90, for instance.

Each transistor 11 may illustratively be a type such as disclosed in Patent 2,855,524 of W. Shockley, issued October 7, 1958, mentioned supra. Such a transistor 11 is of four-layer junction type capable of functioning in two operational states, dependent on the voltage applied thereacross and the current therethrough. For applied voltages, below a first predetermined value, the transistor 11 operates in a high impedance region, to all purposes presenting an open circuit. For applied voltages of a value equal to or greater than the first predetermined value and requisite values of current, the transistor 11 passes through an unstable negative impedance region and is placed in a second low impedance region of operation. The transistor 11 remains in that low impedance region as long as a current of sufficient amplitude is maintained therethrough. To provide such a current, a potential is maintained thereacross of a second predetermined value much less comparatively than the value of the first predetermined potential.

Upon removal of the small sustaining or maintaining current, transistor 11 reverts to the high impedance state, and it is necessary to apply a potential equal to or greater than the first predetermined potential to again place it in the low impedance state.

The transistor 18 is adapted to act as a switch to allow access by the common control circuitry to the selected transistor 11. Each transistor 18, and thus access to each transistor 11, is controlled by positive imput pulses applied through a resistor 21 from a source, not shown, to the base terminal 20. The transistor 18 is biased by a positive potential provided by a source 22 through a resistor 23 to the collector terminal 17 and by a negative potential provided by a source 24 through a resistor 25 to the emitter terminal 19. The input pulses at the base terminal 20 are advantageously of an amplitude such as to saturate the transistor 18 and allow current to flow therethrough.

Referring now to FIG. 3 there are shown four voltage versus time diagrams illustrative of the individual input pulses applied to the various control and access portions of the circuit 10. The diagrams are identified by the portion of circuitry to which each pulse is directed, e.g., access, interrogate, set and reset. The pulse identified as the access pulse is directed to the base terminal 20 of the selected transistor 18 and is illustratively two milliseconds, to allow completion of any of the control operations, explained hereinafter, which it may be desirable to perform upon the selected transistor 11.

Referring again to FIG. 2, it is clear that each transistor 18 controls the access to a memory transistor 11. The base terminal 20 may advantageously be connected through the resistor 21 to a scanning circuit, not shown, which directs pulses to each transistor 18 of the circuit 10 in a predetermined fashion thereby to determine the order of access to each of the transistors 11. For instance, the scanning device might illustratively scan each transistor 11 in numerical order.

*The Control Circuitry*

Connected to point B for interrogating the state of each of the transistors 11 is a transistor 26 having a base terminal 27, an emitter terminal 28 and a collector terminal 29. The collector terminal 29 is connected to the common point B and, thus, through the transistors 18 to each memory transistor 11. The emitter terminal 28 is connected by a resistor 30 to the source 24 to which the base terminal 27 is also connected by a resistor 31 and a resistor 32. A coupling capacitor 33 is connected between the resistors 31 and 32 for applying input pulses to the base terminal 27 from a source of positive pulses, not shown.

For the operation of the control circuitry it will be assumed that access has been gained to one of the transistors 11 by applying a pulse to the base terminal 20 of the connected transistor 18. Upon the advent of a pulse at the base terminal 27, the transistor 26 is placed into operation in its linear region. When the transistor 26 operates, the resistor 30 and the collector to emitter impedance of the transistor 26 are effectively placed in parallel with the resistor 25 allowing increased current to flow through the selected transistor 18 and the memory transistor 11 connected thereto, if that memory transistor 11 is in the low impedance state. The value of current flow during interrogation is controlled by the value of the resistor 30 and the impedance of the transistor 26 to be only slightly greater than that through the selected memory stage when no control operation is performed thereon. The pulse applied at the base terminal 27 of the transistor 26 is a positive pulse such as that identified in FIG. 3 as the interrogate pulse. The pulse is illustratively of short duration and low amplitude maintaining the transistor 26 in the amplifying state for approximately one microsecond.

Another portion of control circuitry connected to point B includes a collector terminal 36 of an NPN junction transistor 37 having a base terminal 38 and an emitter terminal 39. The emitter terminal 39 is connected to the source 24 through a resistor 40, and the base terminal is connected through a resistor 49 to a source of positive pulses, not shown, of an amplitude appropriate to saturate the transistor 37. The resistor 40 is of a value of resistance less than that of the resistor 30 such that upon its connection in parallel with the resistor 25, the current through the selected access transistor 18 increases greatly. This portion of input circuitry is known as the "set" input since its operation places the selected transistor 11 in the "set" or low impedance state, as explained hereinafter.

The input pulses applied to the base terminal 38 of the transistor 37 are of a type identified in FIG. 3 as a set pulse. These pulses are of a much greater length, e.g. 25 times greater, than the pulses applied to the transistor 11 by the interrogating circuitry.

Also connected to the common point B is a collector terminal 41 of a third control transistor 42. The transistor 42 has an emitter terminal 44 connected through a resistor 45 to the source 24 and a base terminal 43 connected through a resistor 46 to a source of positive input pulses, not shown. The source of pulses, not shown, furnishes a pulse, described in FIG. 3 as a reset pulse, of an amplitude great enough to saturate the transistor 42 and place the resistor 45 in parallel with the resistor 25. The resistor 45 is of a value less than that of the resistor 40 to allow greater current flow through the circuit 10 during the operation of the transistor 42 than during the operation of the transistor 37.

The operational states of the transistors 11 are controlled and interrogated by the common circuitry connected to the common point B which circuitry is adapted to provide the potentials necessary across the selected one of the transistors 11 for producing the desired state of operation.

The voltage across the selected transistor 11 is controlled by the voltages provided by the source 35 and the source 22 and the voltages across the resistors 14, 16 and 23. The values of the voltages at the sources 22 and 35 are maintained such that if the transistor 11 is in the high impedance state the voltage thereacross is approximately two-thirds of the potential required for switching to the low impedance state. Since the voltage across the resistor 23 is determined by the current therethrough and that current is determined by the total impedance of the circuitry connected thereto, the voltage across each transistor 11, in the high impedance state with no voltage across the resistor 14, is determined and controlled by the value of the impedance connected to the resistor 23 by the various control elements. If the impedance is large, little current flows, and only a small voltage appears across the resistor 23 while if the impedance is small, a large current and voltage are produced.

The actual switching of the circuit 10 is effected by the capacitor 15 connected in parallel with the resistor 14 to each transistor 11. The capacitor functions in a manner described in a copending patent application Serial No. 798,746, filed March 11, 1959, of W. C. Jones and P. G. Ridinger, now United States Patent No. 3,021,436, issued February 13, 1962.

Basically, the operation is as follows. In the high impedance state the voltage applied across each transistor 11 is approximately two-thirds that required for switching to the low impedance state. If a low impedance such as the resistor 40 of the set control circuitry is connected to the resistor 23, the voltage across the selected transistor 11 and thus the current therethrough is great enough to switch the selected transistor 11 to the low impedance state.

During the time the resistor 40 is connected by the operation of the transistor 37, capacitor 15 charges to a voltage determined by the duration of connection of the resistance 40 and the values of the resistors 14, 16, 23, 25 and 40 to be less than that which would, upon removal of the resistor 40 from the circuit 10, cause the current through the selected transistor 11 to fall below that necessary to sustain operation in the low impedance state. Thus, upon removal of the resistor 40 and the deenergizing of transistor 18, the transistor 11 remains in the low impedance state and a voltage is built up on the capacitor 15 determined by the voltage divider action of the resistors 14, 16 and 23. The transistor 11 will remain in the low impedance state indefinitely because the resistors 14, 16, and 23 are chosen to be of value such that sufficient sustaining current is furnished.

Upon connecting the resistor 45 to the resistor 23 by operating the transistor 42, the voltage across the capacitor 15 begins to build up again but from a higher initial value due to the charge already on the capacitor 15. At the release of the resistor 45, by turning off the transistor 42, the voltage on the capacitor 15 is sufficiently great so that the selected transistor 11 does not have adequate current therethrough to sustain operation in the low impedance state and it reverts to the high impedance state.

If, on the other hand, the resistor 30 is connected to the resistor 23 by operating the interrogating transistor 26, the changes in voltage and current are too small and the duration too short to cause switching of the selected transistor 11. It is to be noted from FIG. 3 that the input pulse to transistor 26 is only one-twenty-fifth as long as the pulses to transistors 37 and 42. Thus, since the voltage at the selected capacitor 15 depends on the duration of current produced by the various control circuitry, the operation of the transistor 26 is ineffective to change that voltage appreciably. This feature permits non-destructive interrogation or read-out of the condition of transistors 11, and is particularly advantageous in this type of circuit in consequence of the need for constant and repetitive interrogation, as explained infra.

*The Hold Current Supply*

Connected to the common point A is an NPN transistor 50 having a base terminal 51, an emitter terminal 52 and a collector terminal 53. The emitter terminal 52 is connected to common point A, the base terminal 51 to a source of potential 55 through a resistor 54, and the collector terminal 53 to the source 55 through an inductor 56. The potentials furnished by the sources 35 and 55 are such as to bias the transistor 50 for amplifier operation.

When any one of transistors 11 changes state there is a sudden change in the current supplied to the circuit 10. This change in current could, without compensating circuitry, cause an accompanying change in voltage at the common points large enough, instantaneously, to cause improper operation of the various non-selected transistors 11 connected thereto. The transistor 50 and the source 55 are therefore provided to act in conjunction with the source 35 as a current supply for the transistors 11 in the ON state and to damp any voltage excursions of point A which might inappropriately operate non-selected ones of the transistors 11 while allowing enough voltage excursion thereat to provide a detectable circuit output.

If the circuit 10 is operating and an additional transistor 11 is switched to the low impedance state the total current through the circuit 10 increases. This increase would normally tend to lower the voltage at point A, possibly removing sustaining potential from ON ones of the transistor 11. The source 35 and the diode 34, however, clamp the voltage at point A so it does not fall below a value equal to that supplied by source 35, for example, as illustrated, 37 volts.

At the same time, the transistor 50, which is biased to normally operate in the amplifying region, tries to furnish some of the additional current. However, no instant current change through the inductor 56, connected to the collector 53, is possible, and a large voltage appears across the inductor 56, positive at the terminal connected to the source 55 with respect to the other terminal thereof. This voltage overcomes the back biasing voltage provided across the resistor 54 and the transistor 50 is forward biased at its base-collector junction. As the transistor 50 saturates, the drop thereacross becomes negligible, and the emitter 52 takes on approximately the same potential as the collector 53. The voltage at the collector 53 is less than that furnished by the source 55, 40 volts as illustrated, by the voltage drop across the inductor 56. The voltage at the emitter 52 cannot, however, drop below the voltage furnished by the source 35 due to the clamp furnished by the diode 34. Thus a slight voltage excursion from the potential furnished by the source 55 is provided, at the common point A.

If, on the other hand, one of the transistors 11 operating in the low impedance state is switched to the high impedance state, the total current through the circuit 10 decreases and the voltage at point A tends to increase.

As the total circuit current attempts to decrease, the current through the inductor 58 attempts to change. The attempted change of current produces a large voltage across the inductor 56, positive at the bottom thereof with respect to the top as viewed in the drawing; and this voltage, in cooperation with the voltage across the resistor terminal 54, back-biases the collector terminal 53 with respect to the base 51. Such a back-biasing effect causes the transistor 50 to operate in its linear amplifying region wherein the currents from the various terminals are controlled by the values of the current at all the other terminals. Since the collector current remains constant instantaneously, so must the base current which is a constant fraction thereof. And since the base current remains constant, the voltage across the resistor 54 remains constant. In the linear region, there is no appreciable drop between the base and emitter terminals of a transistor because of the forward biasing applied thereto. Thus, since the transistor 50 is biased for normal amplifier operation and it remains in that state, the emitter terminal 52, due to forward biasing of the emitter and base terminals 52 and 51, is at and remains at the same voltage as the base terminal 51, or slightly less than the 40 volts supplied by the source 55.

As the current through the inductor 56 reduces exponentially the current through the resistor 54 reduces in the same manner. At all times, however, the voltage at the emitter terminal 52 remains approximately the same as that at the base terminal 51 thus, below 40 volts as long as the transistor 50 is in the linear condition since there is always some drop across the resistor 54 as long as current flows therethrough.

Thus the point A is clamped to a small excursion (between the levels of sources 35 and 55) of approximately 3 volts which has been found to be great enough to produce a detectable output yet not great enough to cause improper switching of the transistors 11.

*The Output Circuitry*

When the interrogating operation is performed by operating the transistor 26 to determine the state of the selected transistor 11, the 3-volt excursion allowed at point A provides a means for detecting the state of that transistor 11. Operating the transistor 26 causes a slight increase in the current through the circuit 10 and an accompanying slight drop in voltage at point A.

As point out, supra, applying a pulse, as shown in FIG. 2 to the base terminal 27 of the transistor 26 after transistor 18 is energized inserts a smaller impedance in the circuit between point B and the source 24 than was present theretofore. Reducing the impedance reduces the voltage therebetween. If the selected transistor 11 is in the high impedance state, the change in voltage is so small compared to the total voltage between points A and B, that it is negligible. If, however, the transistor 11 is in the low impedance state the voltage change amounts to some slight but detectable value and a negative-going voltage pulse is realized at point A.

Connected to the common point A is a capacitor 60 which is of a value such as to couple the aforementioned negative pulse to a base terminal 61 of an NPN junction transistor 62. The transistor 52 has an emitter terminal 63 and a collector terminal 64. The emitter terminal 63 is biased by a negative source of potential 65 through a resistor 66, the collector terminal by a positive source of potential 67 through a resistor 68, and the base terminal 61 by a negative source of potential 69 connected thereto by a resistor 70. The values of the potentials furnished by the source 65, 67 and 69 are such as to place the transistor 62 in its linear operating region.

As may be seen, a negative pulse at the base terminal 61 tends to decrease the current through the transistor 62 thus increasing the potential thereacross and raising the voltage at the collector terminal 64. This, in effect, inverts and amplifies the negative input pulse and applies it as a larger positive pulse to a base terminal 71 of an NPN junction transistor 72.

The transistor 72 has an emitter terminal 73 connected to a source of negative potential 75 through a resistor 76 and a collector terminal 74 connected to ground. In addition, a capacitor 77 is connected to the emitter terminal 73 and to a diode 79, and a resistor 78 is connected between the diode 79 and the capacitor 77 and to the source 75. These connections bias the transistor 72 for linear operation so that when the inverted and amplified pulse is received at the base terminal 71 as a positive pulse, increased current flows through the transistor 72 producing a positive potential at the emitter terminal 73 with respect to the potential furnished by the source 75 due to the voltage across the resistor 76. This positive voltage pulse is repeated by the capacitor 77 and the resistor 78 through the diode 79 to a detecting circuit, not shown, where comparison is made with the present state of the associated link to determine whether subscriber service is required.

Thus an output is realized when the selected transistor 11 is in the low impedance state while none is realized when it is in the high impedance state. The means for determining the prior states of the transistors 11 is therefore furnished by this circuit 10.

The detector circuitry, not shown, is inhibited after the interrogating pulse to prevent any undesired signals due to "set" or "reset" pulses.

As mentioned supra, the output or lack of output signal realized by pulsing the base terminal 27 and thereby energizing the interrogating transistor 26, when the selected transistor 11 has been connected thereto by operating the selected access transistor 18, is compared with a signal indicative of the state of the link corresponding to the selected transistors 11. If the states of the link and the transistor 11 differ, circuitry, not shown, is activated to operate either the set transistor 37 or the reset transistor 42 by pulsing the base 38 or 43 thereof, to place the selected transistor 11 in the same state as its corresponding link. After this setting or resetting is accomplished the next succeeding transistor 11 is interrogated, in a like manner, by operating the interrogating transistor 26 and the corresponding access transistor 18.

The parameters of the elements of the embodiment of FIG. 2 may advantageously take the following illustrative values:

| | | |
|---|---|---|
| PNPN transistors **11**: | | |
| Breakdown voltage | volts | ≈50 |
| Sustaining current | ma | ≈1 |
| Transistor **18** | | WE 2N560 |
| Transistor **26** | | WE 2N560 |
| Transistor **37** | | WE 2N560 |
| Transistor **42** | | WE 2N560 |
| Capacitor **15** | μf | 0.01 |
| Capacitor **33** | μf | 0.003 |
| Capacitor **60** | μf | 0.01 |
| Capacitor **77** | μf | 0.01 |
| Inductor **56** | mh | 15 |
| Diode **34** | | WE 2030 |
| Resistor **14** | ohms | 5.6K |
| Resistor **16** | do | 1.2K |
| Resistor **21** | do | 560 |
| Resistor **23** | do | 6.8K |
| Resistor **25** | do | 3.9K |
| Resistor **30** | do | 3.9K |
| Resistor **31** | do | 8.2K |
| Resistor **32** | do | 8.2K |
| Resistor **40** | do | 1.8K |
| Resistor **45** | do | 240 |
| Resistor **46** | do | 560 |
| Resistor **49** | do | 3.6K |
| Resistor **54** | do | 560 |
| Resistor **66** | do | 1.5K |
| Resistor **68** | do | 15K |
| Resistor **70** | do | 3K |
| Resistor **76** | do | 10K |
| Resistor **78** | do | 10K |

It is to be understood that the above-described arrangement is illustrative of the application of the principles of this invention. Numerous other arrangements may be devised by those skilled in the art without departing from the spirit and scope of the invention.

What is claimed is:

1. A memory circuit comprising a plurality of bistable memory cells connected in parallel each including an input terminal, an output terminal, an access means for selecting predetermined ones of said cells; common set, reset, and interrogating means connected to said input terminals of said cells for providing pulses to selected ones of said cells; common output means including amplifying means connected to said output terminals of all of said cells; and common hold-current-supply means including a first source of potential, unidirectional current means connecting said first source of potential and said output terminals to maintain said output terminals at a potential greater than the potential supplied by said first source, and a transistor amplifier comprising a transistor having base, emitter, and collector electrodes, a second source of potential greater than the potential supplied by said first source, an inductor connecting said collector electrode to said second source, a resistor connecting said base electrode to said second source, and means connecting said emitter electrode to said output terminals whereby the potential at said output terminals is maintained at a value less than the value of the potential supplied by said second source.

2. A memory circuit comprising a plurality of two-state devices, each of said devices having a first and a second terminal; a plurality of charging means, each of said charging means connected to said first terminal of individual ones of said plurality of devices and at a common point to all the others of said charging means; a first source of potential connected by unidirectional current means to each of said charging means at said common point; a first, a second and a third impedance; a second source of potential connected to all of said impedances; switching means for individually and noncoincidentally connecting each of said impedances to a selected one of said plurality of devices at said second terminal thereof; output means connected to all of said plurality of charging means at said common point including a third source of potential for maintaining the voltage thereat below a predetermined value and including amplifier means for detecting a change in voltage at said common point.

3. A memory circuit as in claim 2 wherein said output means includes a transistor amplifier comprising a transistor having base, emitter, and collector terminals, said collector terminal inductively coupled to said third source of potential, said base terminal resistively connected to said third source of potential, and said emitter terminal connected to said common point.

4. A memory circuit as in claim 2 wherein said output means further includes a transistor regulator inductively coupled to said third source of potential and connected to all of said charging means at said common point.

5. A memory circuit as in claim 4 wherein each of said charging means includes a resistor and a capacitor connected in parallel.

6. A memory circuit as in claim 4 wherein said amplifier means includes a first amplifier having an input terminal capacitively coupled to said common point, and an output terminal; and a second amplifier having an input terminal connected to said output terminal of said first amplifier, and an output terminal.

7. A memory circuit as in claim 6 wherein said first and second amplifiers comprise transistor amplifiers connected in driving and driven relationship to operate as an amplifier-inverter.

8. A memory circuit as in claim 4 wherein said switching means includes transistor switches for connecting each of said impedances to each of said devices.

9. A memory circuit as in claim 4 wherein each of said devices includes a two-terminal PNPN junction transistor.

10. A memory circuit comprising a plurality of two-state devices, each of said devices having a first and a second terminal; a plurality of charging means, each of said charging means connected to said first terminal of individual ones of said plurality of devices and at a common point to all the other of said charging means; a first source of potential connected by unidirectional current means to each of said charging means at said common point; a second source of potential; switching means for connecting said second source of potential to a selected one of said plurality of devices at said second terminal thereof; output means including a third source of potential and a transistor having a base, a collector and an emitter, said base resistively connected to said third source, said collector inductively connected to said third source, and said emitter connected to all of said plurality of charging means at said common point for maintaining the voltage thereat below a predetermined value.

11. A memory circuit as in claim 10 including interrogating means for interrogating each of said two-state devices, said interrogating means including a transistor connected to said switching means, and a resistor connected to said transistor, said transistor being operable to connect said resistor to said switching means to determine a first of a plurality of current levels therethrough.

12. A memory circuit as in claim 11 including setting means for placing each of said two-state devices in a first operation state, said setting means including a transistor connected to said switching means, and a resistor connected to said transistor said transistor operable to connect said resistor to said swtiching means to determine a second of said plurality of current levels therethrough.

13. A memory circuit as in claim 12 including resetting means for placing each of said two-state devices in a second operation state, said resetting means including a transistor connected to said switching means, and a resistor connected to said transistor, said transistor operable to connect said resistor to said switching means to determine a third of said plurality current levels therethrough.

14. A memory circuit as in claim 10 wherein said switching means includes a plurality of transistors, each of said transistors connected to one of said two-state devices and to said second source, said memory circuit further including first, second, and third impedances and means for connecting each of said impedances to each of said plurality of transistors to respectively interrogate, set and reset said devices by changing the current therethrough, said first impedance being of a greater value than said second impedance, and said second impedance being of a greater value than said third impedance.

References Cited in the file of this patent

UNITED STATES PATENTS

| | | |
|---|---|---|
| 2,693,572 | Chase | Nov. 2, 1954 |
| 2,779,877 | Le Hovec | Jan. 29, 1957 |
| 2,801,296 | Blecher | July 30, 1957 |
| 2,805,397 | Ross | Sept. 3, 1957 |
| 2,862,175 | Guyton | Nov. 25, 1958 |
| 2,880,331 | MacSorley | Mar. 31, 1959 |
| 2,897,431 | Wolfendale | July 28, 1959 |
| 2,902,642 | Voegtlen | Sept. 1, 1959 |
| 2,902,674 | Billings | Sept. 1, 1959 |
| 2,906,891 | Scanlon | Sept. 29, 1959 |
| 2,907,000 | Lawrence | Sept. 29, 1959 |
| 2,913,594 | Eckert | Nov. 17, 1959 |